(12) United States Patent
Subbiah

(10) Patent No.: US 7,424,532 B1
(45) Date of Patent: Sep. 9, 2008

(54) METHOD AND SYSTEM FOR AUTOMATIC NETWORK RESOURCE SELECTION AND CONFIGURATION IN A NETWORK ENVIRONMENT

(75) Inventor: Barani Subbiah, Sunnyvale, CA (US)

(73) Assignee: 3Com Corporation, Marlborough, MA (US)

( * ) Notice: Subject to any disclaimer, the term of this patent is extended or adjusted under 35 U.S.C. 154(b) by 694 days.

(21) Appl. No.: 10/077,824

(22) Filed: Feb. 15, 2002

(51) Int. Cl.
*G06F 15/173* (2006.01)
(52) U.S. Cl. .................. 709/226; 709/225; 707/101
(58) Field of Classification Search ............... 709/226, 709/209, 228, 225; 707/10
See application file for complete search history.

(56) References Cited

U.S. PATENT DOCUMENTS 6,523,065 B1 * 2/2003 Combs et al. ............... 709/226

2004/0010592 A1 * 1/2004 Carver et al. ............... 709/226

* cited by examiner

*Primary Examiner*—Jason D Cardone
*Assistant Examiner*—Adnan M Mirza

(57) ABSTRACT

A method for selecting and configuring a network resource, out of a plurality of network resources, for use with a computer system client. The method includes the step of determining what network resources reside within a network. The respective attributes of the network resources are then assessed. A determination is then made as to which of the network resources best corresponds to a desired attribute. Configuration software for the best corresponding network resource is then installed on the client and the best corresponding network resource is prepared for use by the client. The installation of configuration software can include installing a driver for the best corresponding network resource. A map showing a location of the best corresponding network resource with respect to the client can be accessed. The determination of which of the network resources best corresponds to the desired attribute can be dynamically updated as a location of the client changes.

10 Claims, 6 Drawing Sheets

METHOD AND SYSTEM FOR AUTOMATIC NETWORK RESOURCE SELECTION AND CONFIGURATION IN A NETWORK ENVIRONMENT

TECHNICAL FIELD

The present invention relates generally to configuration of digital computer systems and computer system networks. More specifically, the present invention pertains to a method and system for communication configuration between network computer system devices.

BACKGROUND ART

The use of network based electronic communications and information processing systems for information control and information retrieval has rapidly proliferated in modern business environments. Within a typical enterprise, hundreds of client computer systems and server computer systems are constantly accessed by hundreds, or even thousands, of users for obtaining company information, news, competitive information, training materials, and the like, via one or more company wide LANs (local area networks) or WANs (wide area networks).

As used generally, the term network refers to a system that transmits any combination of voice, video and/or data between users. The network includes the embodying system of connected clients and servers and their associated software (e.g., network operating system in the client and server machines, the cables connecting them and the supporting hardware, such as bridges, routers, switches, etc.).

LANs and WANs are generally differentiated by the geographical area of the users being served. Both are made up of servers, clients, NOS (network operating system) services and supporting hardware. Servers are typically high-speed computer systems that hold programs and data or perform services that are shared by network users (e.g., the clients). The clients (e.g., desktop computer systems, workstations, and the like) are typically used to perform individualized, stand-alone processing and access the network servers as required. The actual communications path hardware is the cable (twisted pair, coax, optical fiber) that interconnects each network adapter. In wireless systems such as WLANs (wireless LANs) and the like, antennas, access point devices, and towers are also part of the network hardware. The overall scheme of multiple individual clients connected to shared servers comprises the well known client server network architecture.

The widespread implementation of networked computer systems poses a significant configuration problem for network managers. Communication and message transfer within client server networks is generally managed by a transport protocol such as, for example, TCP/IP, IPX, or the like. The physical transmission of data is typically performed by the access method (Ethernet, Token Ring, etc.) which is implemented in the network adapters that are plugged into the computer systems. The standardized communications protocols enable the widespread interoperability of communications networks and the widespread exchange of business related information.

New devices being added to a network or being temporarily coupled to the network need to be configured in order to exchange information with and otherwise communicate with other devices on the network. Providing proper configuration between and among various network resources is generally implemented through the use of certain standardized communication protocols. These protocols are designed to provide a degree of security for transmission of information while also ensuring interoperability among the hardware components of different networks. Network managers, and the various users, ensure the hardware components inter-operate correctly.

In some cases, the new device is physically coupled to the network infrastructure and configured to work with standardized wired protocols. Such protocols include wired Ethernet, Apple Talk, IPX, and the like). In other cases, the new device couples to the network wirelessly, using more recent wireless networking protocols. Such wireless protocols include IEEE 802.11, WLAN, IRLAN, Bluetooth, and the like. In both the wired and the wireless cases, once the new device is communicatively coupled to the network, many resources and services of the various devices on the network become available. Such services include, for example, network connected printers, network connected display devices (e.g., overhead LCD displays), storage devices, email servers, and the like.

Newly coupled devices often have a number of choices with respect to selecting an appropriate network connected device from which to obtain service. In some cases, the physical attributes of the network device is inconsequential. Examples include Email servers, storage servers, and the like. In other cases, the physical attributes of the network device is very important to the choice of which such device should be selected for use. The physical attributes of each individual network device can be important to a determination of which of a number of such devices is selected for obtaining the service or function. Examples include selecting the nearest printer, out of a number (e.g., 10 or more) of printers in a company, when attempting to print a file or selecting the correct overhead LCD projector when conducting a briefing in one of several briefing rooms of a campus.

Conventional prior art schemes involve manual intervention, by, for example, the user or an IT manager, in selecting and configuring a new device to access and use the appropriate network device. For example, in many cases, an IT (information technology) manager selects and configures the new device to use the nearest network connected printer, display device, or the like. In other cases, the configuration of the new device is left to the user. The user must interact with and navigate the various network protocols and settings in order to select the appropriate device to configure. In both cases, there is often an intricate configuration process, often involving a number of steps, that must be executed. The user often needs to wait for the IT manager to configure her device before she can use it. This can be especially problematic for mobile computer system equipped for wireless communication. Wireless network enabled computer systems are specifically intended for mobile use, and thus, often encounter new network environments.

Thus what is required is a solution that automatically configures a new device for functioning with a network connected device. What is required is a solution that can automatically select a most appropriate network device, out of a number of such devices, for configuration and use. The required solution should be compatible with the ease of use and mobility characteristics of wireless mobile computer systems. The present invention provides a novel solution to the above requirements.

SUMMARY OF THE INVENTION

Embodiments of the present invention comprise a method and system for automatic network resource selection and configuration in a network environment. Embodiments of the present invention provide a solution that automatically configures a new client device for functioning with a network connected device. Embodiments of the present invention are able to automatically select a most appropriate network device, out of a number of such devices, for configuration and use. Additionally, embodiments of the present invention are compatible with the ease of use and mobility characteristics of wireless mobile computer systems.

In one embodiment, the present invention is implemented as a computer implemented method that automatically selects and configures a network resource, out of a plurality of network resources, for use with a computer system client. The process includes the step of determining what network resources are reside within a network domain or network environment. For example, when a new device is coupled to a network or a mobile device arrives at a different network or a new portion of an existing network, the new device (e.g., computer system client) determines what network resources are available for its use (e.g., printers, overhead display devices, mail servers, storage, etc.). The new device then assesses the respective attributes of the network resources it discovers (e.g., resource location, features, memory, etc.).

A determination is then made as to which of the network resources best corresponds to a desired attribute. Example desired attributes include distance from the client (e.g., how far away is a printer), features of the resource (e.g., color printer, laser printer, transparencies, etc.), and the like. Once a determination is made as to which of the network resources best corresponds to the desired attribute, configuration software for the resource is installed (e.g., software drivers, etc.) and the resource is prepared for use by the client.

Embodiments of the present invention can also comprise accessing a map showing a location of the best corresponding network resource with respect to the client. Additionally, the determination of which of the network resources best corresponds to the desired attribute can be dynamically updated, for example, as a location of the client changes. A location of the client can be determined by recognizing an access point the client uses to couple to the network. In a case where the client is a wirelessly connected client, location can be determined, for example, through triangulation between wireless access points.

BRIEF DESCRIPTION OF THE DRAWINGS

The present invention is illustrated by way of example and not by way of limitation in the figures of the accompanying drawings, in which like reference numerals refer to similar elements, and in which.

DETAILED DESCRIPTION OF THE INVENTION

Figure 1:
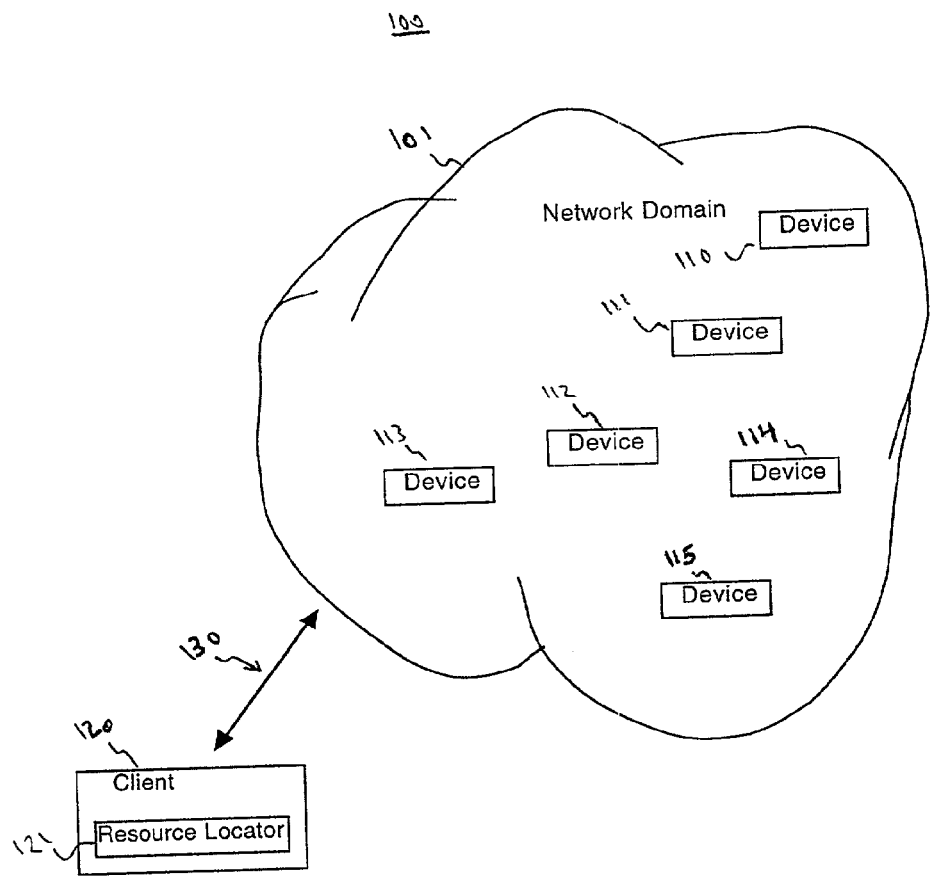
FIG. 1 shows an overview of a network resource selection and configuration system in accordance with one embodiment of the present invention.

In the following detailed description of the present invention, a method and system for simultaneous high bandwidth peer to peer data input-output, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 612 of FIG. 6), or similar electronic computing device, that manipulates and transforms data represented as physical (electronic) quantities within the computer system's registers and memories into other data similarly represented as physical quantities within the computer system memories or registers or other such information storage, transmission or display devices.

DESCRIPTION OF THE EMBODIMENTS

Embodiments of the present invention comprise a method and system for automatic network resource selection and configuration in a network environment. Embodiments of the present invention provide a solution that automatically configures a new client device for functioning with a network connected device. Embodiments of the present invention are able to automatically select a most appropriate network device, out of a number of such devices, for configuration and use. Additionally, embodiments of the present invention are compatible with the ease of use and mobility characteristics of wireless mobile computer systems. Embodiments of the present invention and their benefits are further described below.

FIG. 1 shows a diagram of an automatic network resource selection and configuration system 100 in accordance with one embodiment of the present invention. As depicted in FIG. 1, system 100 shows a network domain 101 including a plurality of network resources 110-115. The network resources 110-115 comprise network connected devices (e.g., server computer systems, print servers, email servers, storage servers, display devices, etc.) that provide functions and services to connected clients. System 100 also shows a client 120 connected to the network domain 101 via a communications link 130. Client 120 is one of a number of clients that at any given time are connected to the network domain 101.

System 100 functions by implementing a method and system for automatic network resource selection and configuration in the network environment 101. Embodiments of the present invention function by automatically selecting and configuring one of the devices 110-115 for use with the client 120. This aspect is particularly useful in a case where, for example, client 120 is mobile client that is newly connected to the network domain 101 via a wireless link 130. Client 120 executes a resource locator application 121 that searches the network domain 101 and determines what network resources reside within network domain 101, such as, in this case, devices 110-115. For example, when client 120 is coupled to the network domain 101, the resource locator 121 determines what resources are available, in this case, devices 110-115. The resource locator 121 then assesses the respective attributes of the network resources (e.g., devices 110-115) it discovers. These attributes can be a number of different features which dictate the capability and performance of the resource.

In the present embodiment, one attribute can be the location of the resource. The location can be described in terms of what floor is the resource on, what department or conference room is it in, or the like. Another attribute can be what features the resource has or supports. For example, in a case where the resource is a printer, the feature attributes can be whether the printer is a color printer, the speed of the printer, whether the printer supports certain paper sizes, what amount of memory is installed, and the like.

Upon analysis of the respective attributes of the devices 110-115, in the present embodiment, a determination is then made as to which of the network resources (e.g., devices 110-115) best corresponds to a desired attribute. Once a determination is made as to which of the devices 110-115 best corresponds to the desired attribute, configuration software for the device is installed (e.g., software drivers, etc.) and the device is prepared for use by the client 120. For example, where the desired attribute is the shortest distance from a location of the client, the resource locator 121 will analyze the attributes of devices 110-115 to select the device having a location attribute closest to the location of the client. Once selected, the configuration software required to configure the selected device for operation with client 120 is installed and the selected device is prepared for use by client 120.

Figure 2:
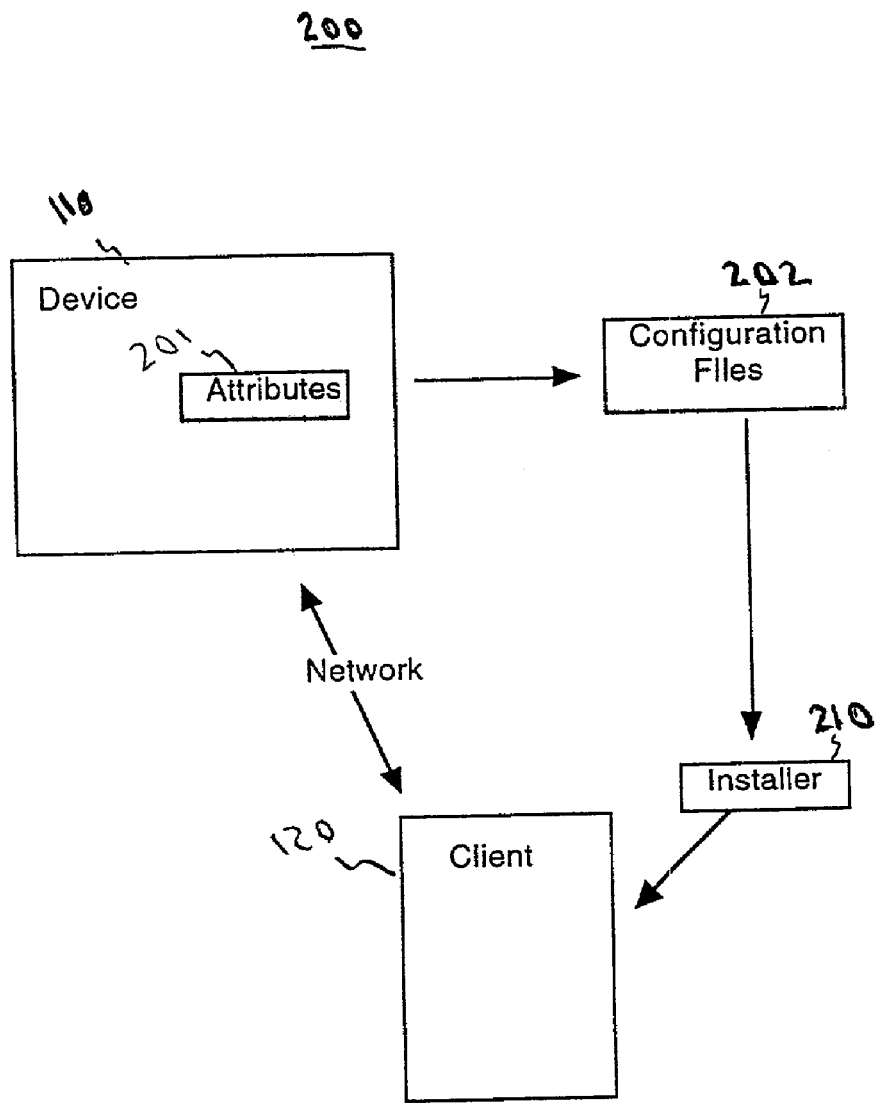
FIG. 2 shows a diagram of a network device and its associated attributes, configuration files, and a client device in accordance with one embodiment of the present invention.

Referring now to FIG. 2, a diagram of a configuration process 200 in accordance with one embodiment of the present invention is shown. As depicted in FIG. 2, the configuration process 200 shows a selected device 110 (e.g., printer, etc.), being configured for use with the client 120.

In the present embodiment, as described above, device 110 is selected by resource locator 121 (shown in FIG. 1) based upon its attributes 201. In this embodiment, the attributes are stored within device 110. Alternatively, attributes 201 and the attributes of the other network resources can be stored in a centralized location for accessing. In the present embodiment, the attributes 201 also specify what configuration files 202 are required for the device 110. The configuration files 202 are accessed by an installer application 210 and are subsequently installed on the client 120. As described above, the configuration files can include one or more software drivers, instructions for use, special connectivity software, or the like. Additionally, the configuration files 202 can also include location information, such as a map, describing the location of device 110. This location can be shown with respect to the location of the client 120.

It should be noted that, in the present embodiment, the configuration files 202 need to be defined only once (e.g., by an IT manager). The configuration files can be defined and maintained at either a centralized location on the network or with a memory of each respective network resource. In either case, once defined, the configuration files do not require intervention again. New clients, such as client 120, can automatically configure themselves to function with the network resources without intervention by an IT manager.

In accordance with one embodiment of the present invention, the determination of which of the network resources best corresponds to the desired attribute can be dynamically updated. One example would be a case where the desired attribute is the shortest distance from client 120, as a location of the client 120 changes with respect to the device 110, a new one of devices 110-115 can be selected as that device becomes closer to client 120 and device 110 becomes further away.

Figure 3:
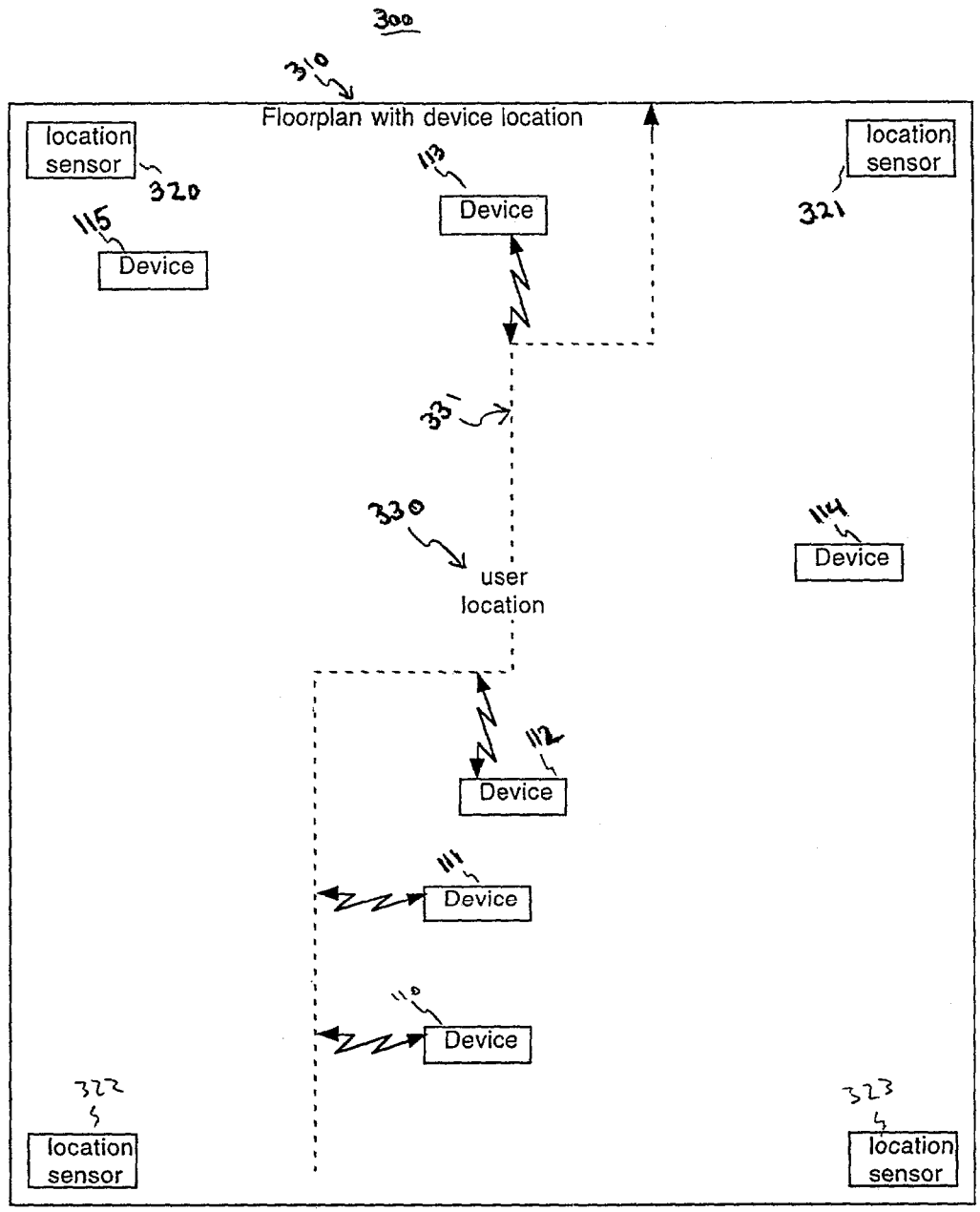
FIG. 3 shows a diagram of a floor plan of an area containing a number of network resource devices and a client and shows a dynamic selection and configuration update process for the client in accordance with one embodiment of the present invention.

Referring now to FIG. 3, a diagram of a location based automatic network resource selection and configuration process 300 is shown. As depicted in FIG. 3, a dynamic update process with respect to user location 330 and the various locations of the devices 110-115. The locations are shown with respect to a top-down floor plan diagram 310. The changing location of the user is shown as the dotted line 331, as the user (e.g., client 120) moves from the bottom of floor plan 310 to the top of floor plan 310.

In the present embodiment, the particular device that is selected and configured for use by the user 330 changes as the location of the user 330 changes. Considering a case where the desired attribute is the shortest distance from the client 120, for example, as shown in FIG. 3, when the user is near the bottom of floor plan 310, the nearest device is device 110. As the user moves along the path 331, the selected device is updated to device 111, and then device 112, and so on. In so doing, the user remains coupled to the nearest device, even as his position changes.

The implementation of location based updating and selecting requires the location of the client (e.g., the user). In accordance with one embodiment of the present invention, a plurality of location sensors 320-323 can be used to triangulate the user's position based on, for example, a wireless communication signal of the user. In a case where the user's client is a wirelessly connected client (e.g., a personal digital assistant, laptop computer, or the like), the communication signal from the client can be used for the triangulation. For example, in such a case, the location sensors can be wireless access points (e.g., WLAN, Bluetooth, etc.).

It should be noted that, in accordance with embodiments of the present invention, other location determination methods can be implemented. In addition to triangulation, a location of the client can be determined by comparing a signal-to-noise ratio of the client's wireless signal as received by different access points. Alternatively, location can be determined by recognizing which access point (e.g., sensors 320-323) the client 120 uses to couple to the network 101 (shown in FIG. 1). In a case where the client uses a wired connection, location can be determined, for example, by recognizing which Ethernet port the client is plugged into.

It should be noted that embodiments of the present invention can check a client to determine whether proper configuration files for a selected device are already installed. For example, in a case where printers are selected and configured for use, embodiments of the present invention can check for a proper printer driver for the selected device is already installed. If so, then the printer is installed by script and setup as a default printer. If there is no proper driver, the correct driver can be obtained as part of the configuration files 202 shown in FIG. 2. These files can be obtained, for example, through an FTP session.

It should be noted that the automatic selection and configuration process of the embodiments described above can be set to trigger either automatically or manually. In a manual mode, for example, a confirmation dialog box can be presented to the user on a display screen of the client. In an automatic mode, the selection and configuration process can occur without requiring intervention on the user's part. For example, in an automatic mode, embodiments of the present invention practically eliminate the notion of a "default printer" since the process can be configured to treat the nearest printer as the default printer. Additionally, this selection of default printer is dynamically updated as the user moves.

Figure 4:
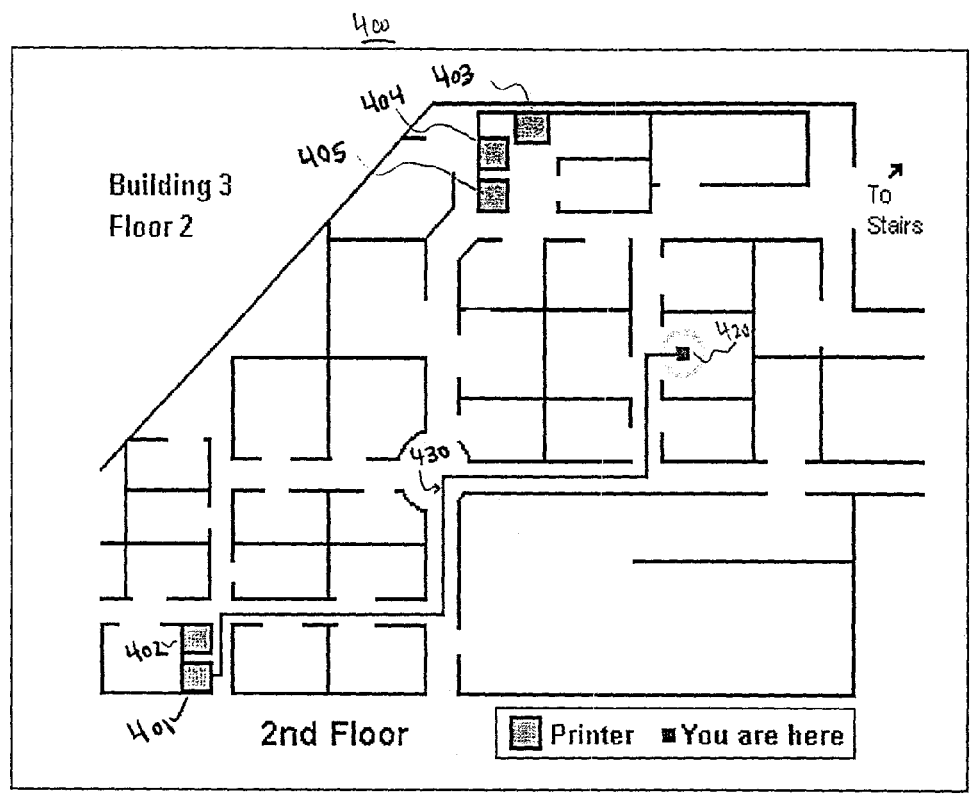
FIG. 4 shows a map of a floor plan of an area showing a suggested route between a client device and a network resource in accordance with one embodiment of the present invention.

FIG. 4 shows a location map generated in accordance with one embodiment of the present invention. FIG. 4 illustrates a floor plan map 400 showing the location of a plurality of printer network resources (e.g., printers 401-405), the location of a mobile client device 420 (e.g., a mobile user), and a suggested route 430 between the client device 420 and a selected printer 401. In this case, the suggested route 430 is the shortest route between the client device 420 and the printer 401.

As described above, once the best matching network resource, in this case printer 401, is selected and configured, the present embodiment provides a map showing the location of the printer 401 and a suggested route 430 enabling the client device 420 to proceed to the printer 401. The map can be provided to the client device in a number of different manners. For example, the map 400 can be provided as a bitmap file included with the configuration files 202 (shown in FIG. 2) that are transmitted to the client device 420. The map can be transmitted to the client device 420 separately, or the like.

It should be noted that embodiments of the present invention can be configured to function with a number of different image formats for implementing the map 400. For example, a Bitmap image format, a Graphics Interchange Format (GIF) image format, a Joint Photographic Experts Group (JPEG) format, and other image formats can be used. The present embodiment uses a Bitmap image format due to the ease with which Bitmap image files are manipulated with many software development kit (SDK) functions.

Referring still to FIG. 4, map 400 comprises a Bitmap image of a typical area of a company (e.g., $2^{nd}$ floor, Building 3, etc.). The Bitmap image is created and stored in a centralized server computer of the network domain. During runtime, the Bitmap file comprising map 400 can be downloaded from a network location in the same manner as a file being opened from another computer in the same network domain. The location of the bitmap file can be specified by, for example, the attributes 201 stored within each of the network resources 110 (shown in FIG. 2), and can be discovered during the query process of a resource locator application (e.g., resource locator 121 shown in FIG. 1).

The suggested route 430 can be generated using, for example, a maze-solving algorithm configured to determine the shortest path from the location of the client device 420 to the selected printer 401, taking into account the location of the walls, cubicals, and the like. In a case where the client device 420 and the selected printer 401 are on different floors, the suggested route 430 can be configured to span two or more different maps. This has the effect of breaking the journey to the selected printer into two or more parts, for example, from the starting point to the nearest stairway, and from the stairway of the next floor to the selected printer.

Figure 5:
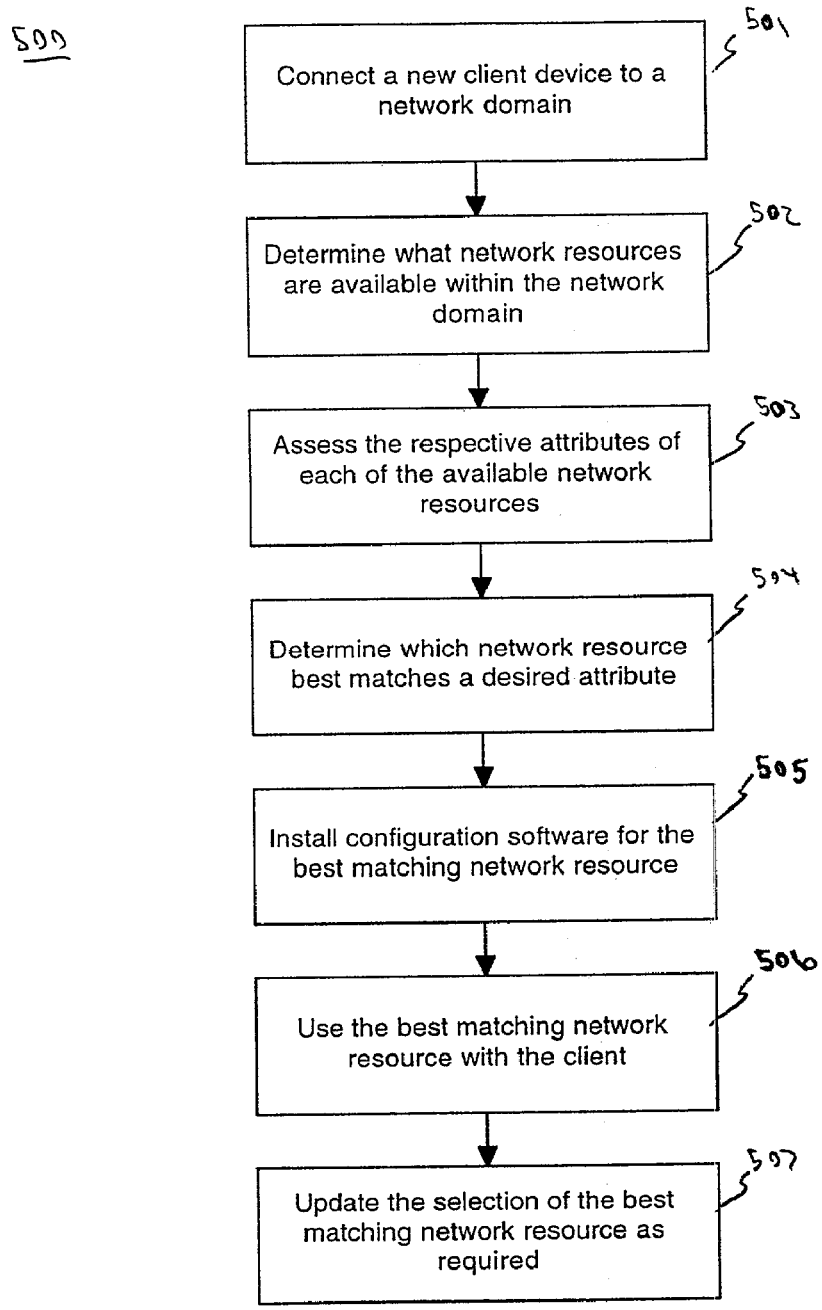
FIG. 5 shows a flow chart of the steps of a device selection and configuration process in accordance with one embodiment of the present invention.

FIG. 5 shows a flowchart of the steps of a process 500 in accordance with one embodiment of the present invention. Processor 500 depicts the steps involved in an automatic network resource selection configuration process as implemented by a client computer system being newly coupled to a network (e.g., client system 120 of system 100 shown in FIG. 1).

Process 500 begins in step 501, where a new client device is connected to a network domain. As described above, the new client device can be a newly arriving device having been brought into the network domain environment for the first time (e.g., a new employee, new contractor, etc.). Similarly, the new client device can be a wirelessly connected mobile computer device (e.g., a personal digital assistant) that tends to roam around among different locations within the network domain environment.

In step 502, the client device determines what network resources are available within the network domain. As described above, embodiments of the present invention utilize a resource locator application to query the network domain and determine what network resources are available for use. Example network resources include printers, display devices, storage servers, and the like.

In step 503, the client device accesses the respective attributes of each of the available network resources. Each network resource discovered during the query of step 502 is matched to the attributes of the network resource. As described above, these attributes can be stored locally within each of the network resource devices. Alternatively, the attributes can be stored at a central location (e.g., a centralized "configuration registry" maintained by an IT manager).

In step 504, the client device determines which network resource best matches a desired attribute. As described above, a desired attribute can be one or more of a number of features of the network resource that the user determines is important. For example, the user may determine that the nearness of the respective printer resources within the network domain is the desired attribute, accordingly, causing the client device to select the closest printer as the best match.

In step 505, the client device installs configuration software for the best matching network resource. As described above, the attributes of each network resource can include software drivers required for configuring the client to function with the network resource. These drivers can be accessed and installed on the client. Alternatively, if the drivers are preexisting on the client, the installation routine can be shortened to merely configuring the best matching network resource for functioning (e.g., designating the nearest printer as the default printer).

In step 506, once the best matching network resource is configured, the client device uses to resource in accordance with any needs of the user.

Subsequently, in step 507, process 500 dynamically updates the best matching network resource as conditions of the client/user change. For example, as described above, in a case where the client device changes location frequently within the network domain environment (e.g., a campus LAN), the best matching network resource can be frequently and dynamically updated with respect to their respective attributes (e.g., nearness to the client).

Figure 6:
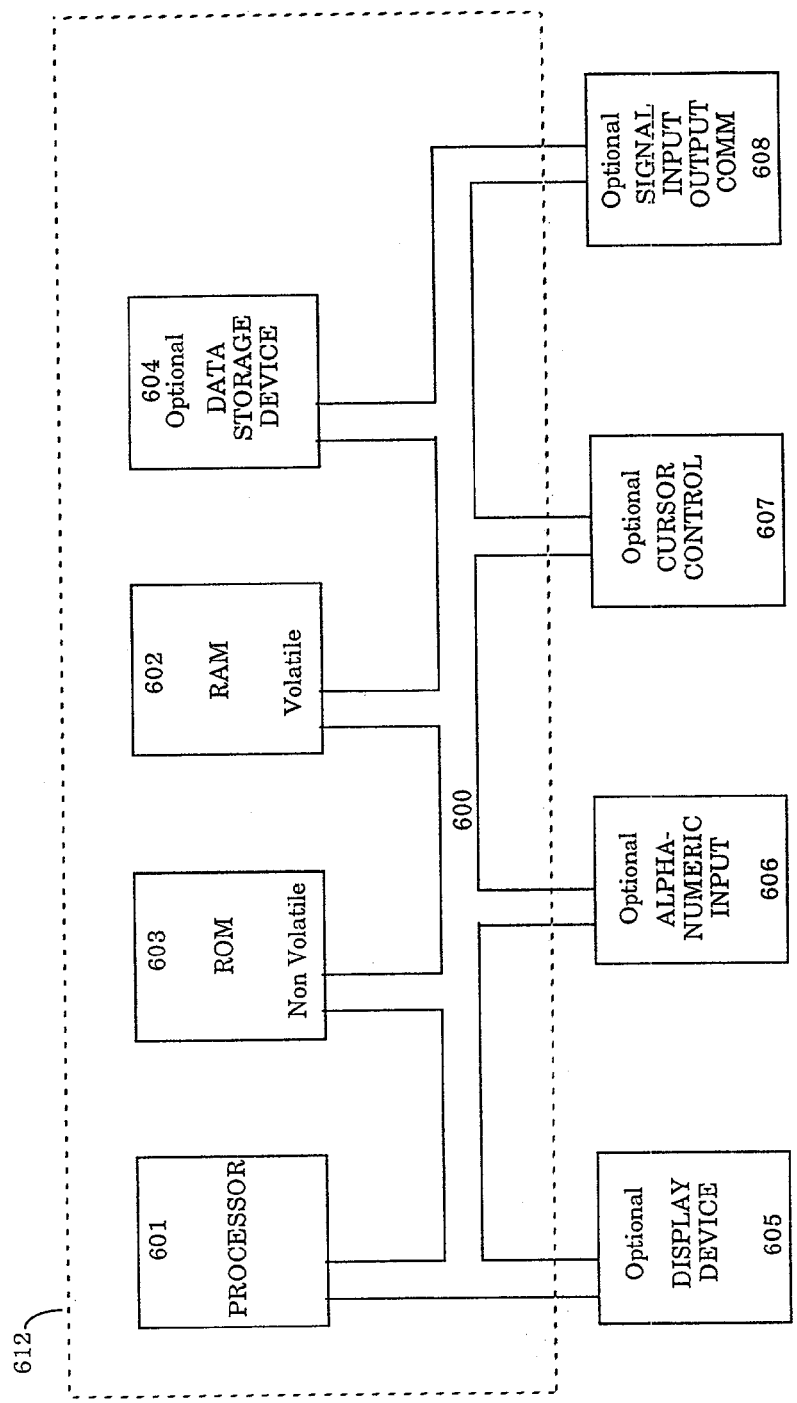
FIG. 6 shows a diagram of a computer system platform for implementing software embodied functions in accordance with one embodiment of the present invention.

Computer System Platform:

With reference now to FIG. 6, a computer system 612 in accordance with one embodiment of the present invention is shown. Computer system 612 shows the components of a computer system in accordance with one embodiment of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 612) and are executed by the processor (s) of system 612. When executed, the instructions cause the computer system 612 to implement the functionality of the present invention as described above.

In general, computer system 612 shows the basic components of a computer system used to implement "server" machines and "client" machines. Computer system 612 comprises an address/data bus 600 for communicating information, one or more central processors 601 coupled with the bus 600 for processing information and instructions, a computer readable volatile memory unit 602 (e.g., random access memory, static RAM, dynamic, RAM, etc.) coupled with the bus 600 for storing information and instructions for the central processor(s) 601, a computer readable non-volatile memory unit (e.g., read only memory, programmable ROM, flash memory, EPROM, EEPROM, etc.) coupled with the bus 600 for storing static information and instructions for the processor(s) 601. System 612 also includes a mass storage computer readable data storage device 604 such as a magnetic or optical disk and disk drive coupled with the bus 600 for storing information and instructions. Optionally, system 612 can include a display device 605 coupled to the bus 600 for displaying information to the computer user, an alphanumeric input device 606 including alphanumeric and function keys coupled to the bus 600 for communicating information and command selections to the central processor(s) 601, a cursor control device 607 coupled to the bus for communicating user input information and command selections to the central processor(s) 601, and a signal generating device 608 coupled to the bus 600 for communicating command selections to the processor(s) 601.

Thus, embodiments of the present invention comprise a method and system for automatic network resource selection and configuration in a network environment. Embodiments of the present invention provide a solution that automatically configures a new client device for functioning with a network connected device. Embodiments of the present invention are able to automatically select a most appropriate network device, out of a number of such devices, for configuration and use. Additionally, embodiments of the present invention are compatible with the ease of use and mobility characteristics of wireless mobile computer systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for automatically selecting a network printer for use by a wireless client device, comprising:
    determining, automatically in a client device connected wirelessly to a local area network (LAN), a location of the client device based on a wireless access point used by the client device to couple to the LAN;
    selecting, automatically by the client device, a network printer on the LAN having a shortest distance to the location of the client device as a default printer for the client device; and
    dynamically updating the default printer selection if the client device roams to a next location in the LAN where a next wireless access point is used by the client device to couple to the LAN.

2. The method of claim 1, further comprising:
    accessing, by the client device, configuration software for the selected network printer; and
    installing the configuration software in the client device.

3. The method of claim 2, wherein the configuration software is stored in the network printer.

4. The method of claim 2, wherein the configuration software is stored in a device including configuration software for a plurality of network printers on the LAN.

5. The method of claim 2, wherein the configuration software is stored in the client device.

6. A method for automatically selecting a network printer for use by a wireless client device, comprising:
    determining, automatically in a client device connected wirelessly to a local area network (LAN), a location of the client device based on a wireless access point, among a plurality of wireless access points communicating with the client device, having a strongest signal-to-noise ratio with the client device;
    selecting, automatically by the client device, a network printer on the LAN having a shortest distance to the location of the client device as a default printer for the client device; and
    dynamically updating the default printer selection if the client device roams to next location in the LAN where a next wireless access point has the strongest signal-to-noise ratio with the client device.

7. The method of claim 6, further comprising:
    accessing, by the client device, configuration software for the selected network printer; and
    installing the configuration software in the client device.

8. The method of claim 7, wherein the configuration software is stored in the network printer.

9. The method of claim 7, wherein the configuration software is stored in a device including configuration software for a plurality of network printers on the LAN.

10. The method of claim 7, wherein the configuration software is stored in the client device.

* * * * *